INVENTORS
HENRY J. HARTLEY
PAULINE SCHROEDER
BY
ATTORNEYS

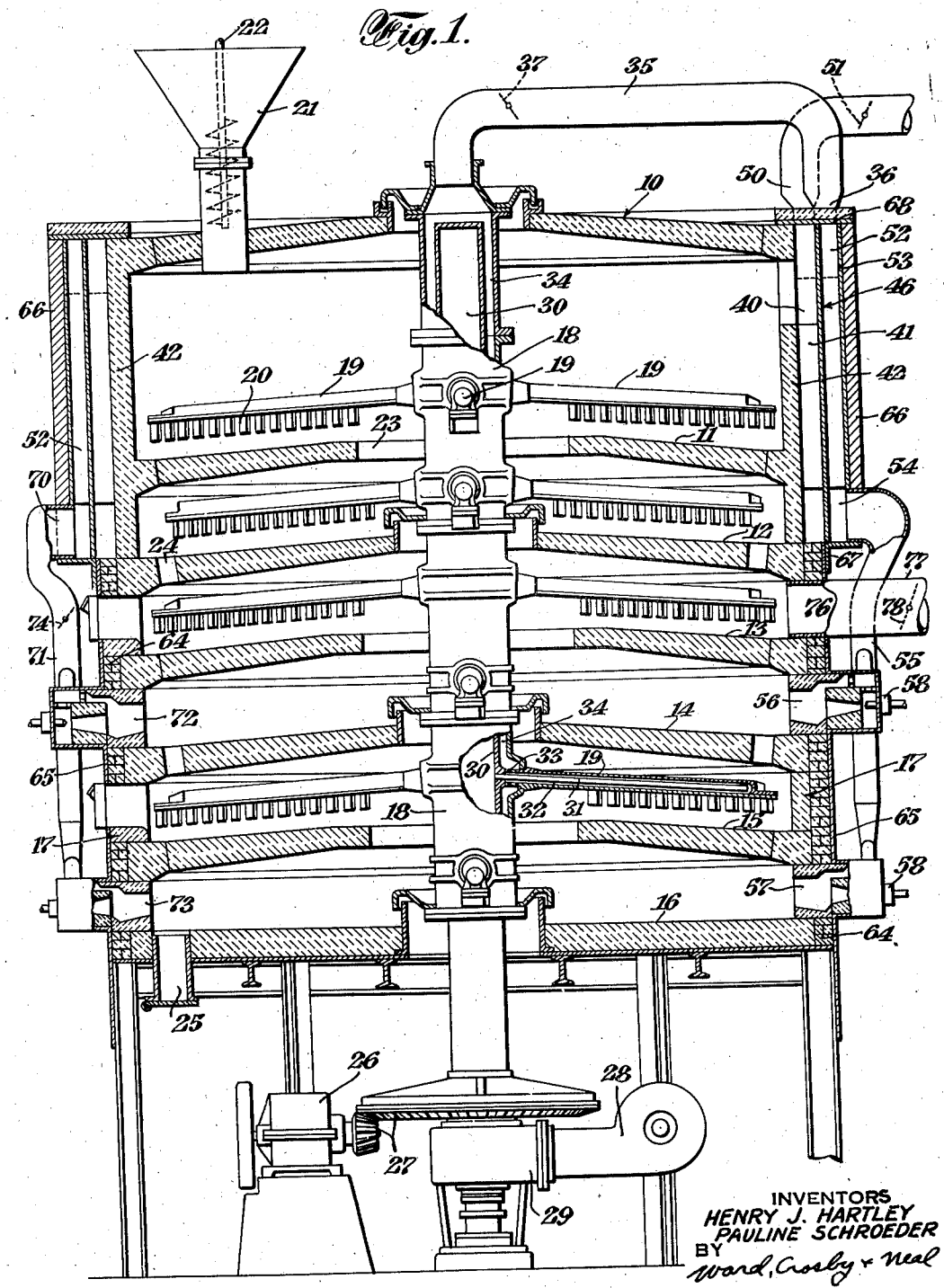

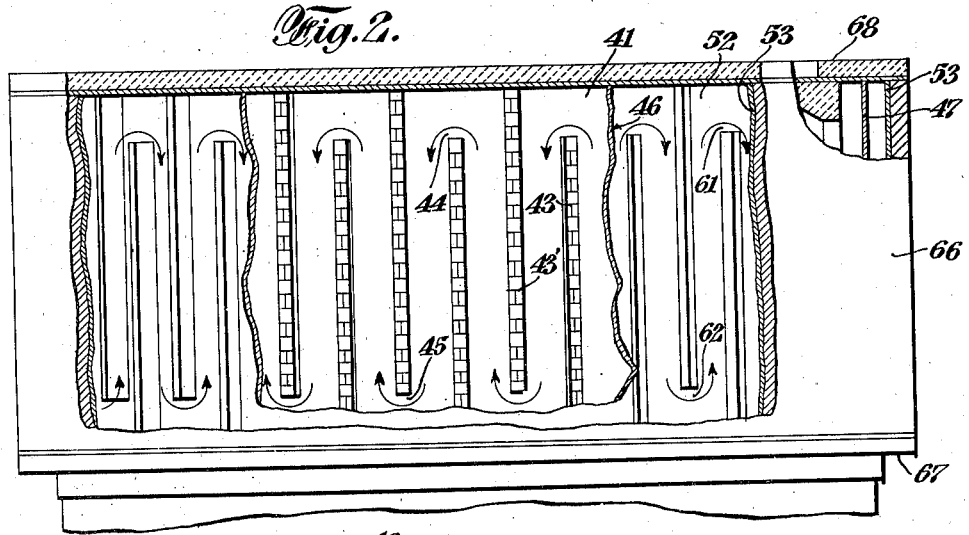
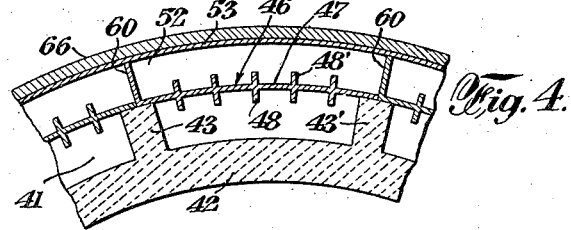
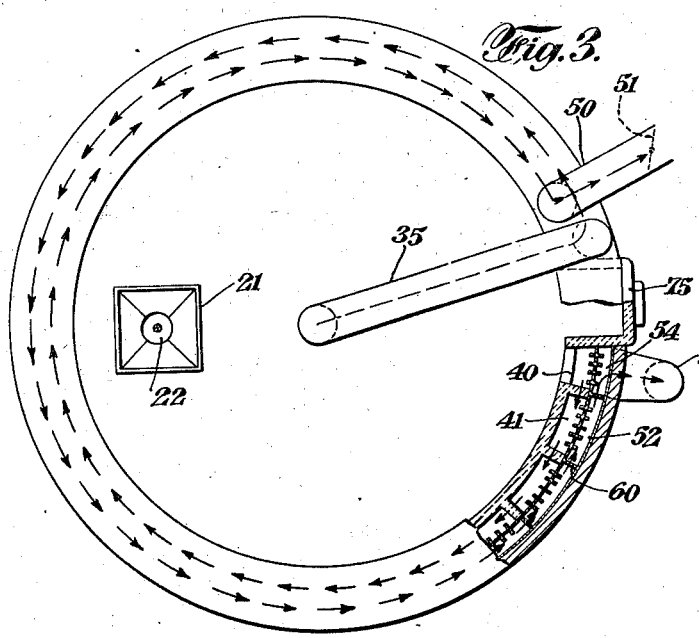
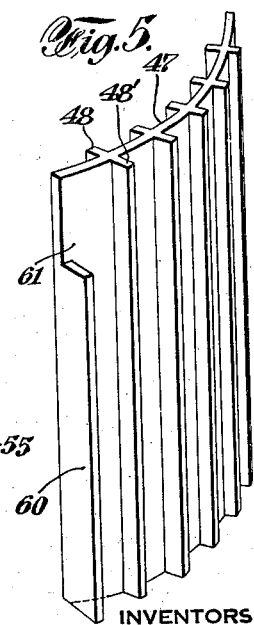

Patented Aug. 2, 1938

2,125,721

UNITED STATES PATENT OFFICE 2,125,721

FURNACE AND RECUPERATOR STRUCTURE

Henry J. Hartley, Hastings on Hudson, N. Y., and Pauline Schroeder, San Francisco, Calif., assignors to Nichols Engineering & Research Corporation, New York, N. Y., a corporation of Delaware Application October 3, 1936, Serial No. 103,812

2 Claims. (Cl. 110—12)

This invention relates to apparatus for drying and incinerating waste materials, such as sewage sludge and/or garbage, and involves various improvements upon the apparatus and process of the patent to Dudley Baird and Robert W. Rowen, No. 2,015,050, granted September 17, 1935.

An important phase of the present invention relates to an improved unitary construction including a furnace for drying and incinerating waste materials, in conjunction with a recuperator for utilizing a substantial portion of the heat of the gaseous products of combustion leaving the furnace, such heat being used to preheat the supply of air admitted to the furnace for aiding combustion therein.

More specifically, the subject matter of this invention in its preferred form involves a furnace construction in which a plurality of superposed hearths are provided surrounded by a substantially cylindrical furnace wall, with a highly efficient and conveniently accessible form of recuperator embodied within or on such furnace wall, such recuperator having gas and air conduits so connected to various parts of the furnace as to conserve heat to an unusual degree and yet being so arranged as to eliminate the necessity of considerable insulating material and piping heretofore necessary with apparatus of this class.

Various further and more specific objects, features and advantages will clearly appear from the detailed description given below taken in connection with the accompanying drawings which form a part of this specification and illustrate merely by way of example preferred forms of the apparatus of the invention.

The invention consists in such novel features, arrangements and combinations of parts as may be shown and described in connection with the apparatus herein disclosed.

In the drawings,

Fig. 1 is a vertical cross-sectional view of one form of apparatus embodying the invention;

Fig. 2 is an elevational view partly broken away of the recuperator as embodied in the apparatus of Fig. 1;

Fig. 3 is a top or plan view partially broken away to show certain parts in section, of the apparatus of Fig. 1;

Fig. 4 is a sectional view along a horizontal plane of a portion of the recuperator and furnace wall structure;

Fig. 5 is a perspective view illustrating in detail one form of a heat conductive member which may be used in the recuperator of Fig. 2 for the transfer of heat from one group of recuperator passages to another;

Figure 6:
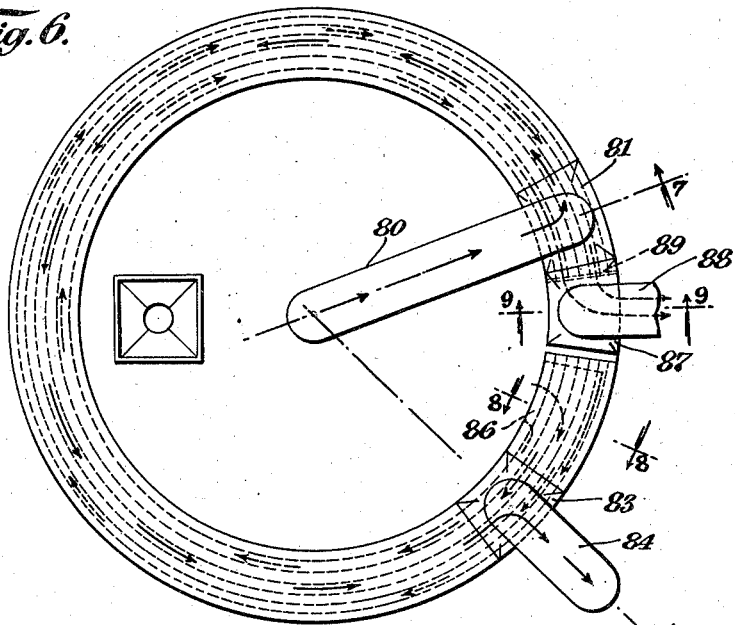
Fig. 6 is a top or plan view of another embodiment of the invention.

Referring to Fig. 1 in further detail, a multiple hearth furnace is shown at 10 which may be of the same general type as that disclosed in said Patent 2,015,050 and having a plurality of superposed hearths as at 11 to 16 inclusive, preferably of arched construction and formed of suitable refractory material embraced and supported by a substantially cylindrical furnace wall as at 17. A vertically rotatable shaft 18 extends up through the middle of the furnace and is provided with a plurality of rabble arms as at 19, extending over each of the several hearths. These rabble arms may be provided with rabble teeth as at 20 for periodically agitating the material on each hearth and gradually advancing such material over each hearth.

The waste material may be introduced at the top of the furnace from a hopper 21 through a suitable feeding device as at 22, which will permit supplies of the material to be continuously or substantially continuously introduced into the furnace without permitting the escape of gases from the furnace. The waste material may fall from the feeding device 22 onto the top hearth 11 and be temporarily retained on such hearth as a layer, while being periodically rabbled toward a central hearth opening as at 23. The material on reaching the opening 23 may drop to the next hearth 12 and is there similarly agitated, broken up, and gradually rabbled toward the periphery of the hearth 12 where it may drop through peripheral hearth openings as at 24 to the succeeding hearth 13. In a similar manner the material is gradually advanced over each succeeding hearth and from hearth to hearth through peripheral and central discharge openings respectively at alternate hearths, down through the furnace, and finally to an ash outlet as at 25.

The shaft 18 may be rotated by a source of power connected through reduction gearing as at 26 and bevel gearing as at 27. Inasmuch as the temperatures within the furnace in operation are quite high, it is desirable to provide cooling means to protect the central shaft and rabble arms and to this end a supply of air may be provided from a blower 28 through a shaft inlet 29 to an internal shaft 30 mounted within the shaft 18 and rotating therewith. Air from the internal conduit 30 may be conducted through conduits as at 31 within each of the rabble arms whereby the cooling air is conducted to the outer ends of the arms, thence back to the central shaft through annular spaces as at 32 in each rabble arm, through openings as at 33 at the rabble arm sockets, to an annular space as at 34 within the central shaft.

The annular space 34 may be connected as by a suitable conduit 35 to an inlet opening 36 for the recuperator hereinafter described. Thus, a continuous flow of air through the cooling conduits of the rabble arms and shaft is provided and this supply of air in passing through such conduits may become preheated to a substantial extent before it is introduced into the recuperator. The flow of this air if desired, may be regulated by a suitable damper as at 37.

The manner in which the waste material is gradually broken into finer and finer pieces in passing through the furnace while being dried on the upper hearths and thoroughly incinerated on the lower hearths, may be substantially as described in said Patent 2,015,050. Reference may also be had to said patent, as to various further features and details of construction of the interior of the furnace shown in the drawings, but which are not hereinabove fully described.

The gaseous products of combustion, vapors and air within the furnace may pass in succession over the layers of waste material being dried and incinerated on the various hearths. With the particular example shown, these gases, etc., may pass countercurrent to the movement of the waste material on each hearth and from hearth to hearth to the top of the furnace, through the various central and peripheral hearth openings. The gases, vapor and air upon arriving at the space above the top hearth, are preferably maintained at a temperature of 1,100° F. or higher to insure the substantial destruction of the odoriferous content of such gases before they are passed out through an exit opening as at 40 to the recuperator, which will now be described.

The hot gases passing through the exit opening 40 may immediately pass into an inner series of tortuous recuperator passages as at 41 (Figs. 1 and 2). These passages preferably extend vertically in side-by-side relationship, and are so interconnected that the gases alternately flow downwardly and upwardly in progressing substantially annularly around the furnace wall. The furnace wall may comprise an inner layer 42 of refractory brick or other suitable heat resistant material and in order to form barriers between adjacent passages 41, one or more tiers of such brick may be extended radially outwardly as at 43, 43' (Figs. 2 and 4), the brick being omitted at the top and bottom of alternate tiers to provide openings as at 44 and 45 for connecting adjacent passages. To provide an outer wall for such passages, a plurality of sections of suitable heat resisting metal of good conductivity may be mounted side-by-side so as to form a substantially annular shell as at 46. One form which such sections may take is indicated at 47 in Fig. 5. Some of these sections which are not likely to be subjected to destructive temperatures may be formed of thin cast iron or suitable sheet iron, but such of the sections as may be subjected to destructive temperatures, are preferably formed of a suitable heat resisting cast alloy. The walls of each of the sections 47 may be provided with integrally cast fins as at 48 or such walls may be corrugated or otherwise shaped to increase the area of contact with the gases flowing thereover. The exit gases from the furnace after passing through the passages 41 annularly around the furnace, may pass through an outlet conduit as at 50 (Figs. 1 and 3) connected to a stack or other means for disposal. The flow of such gases to the stack may be regulated as by a damper 51.

Externally of the passages 41 the recuperator may be provided with an interconnected series of side-by-side vertically extending passages as at 52, embraced and covered by a substantially cylindrical metal casing or wall 53. Preheated air from the cooling conduits of the shaft and rabble arms may be introduced into these latter passages through conduit 35 and inlet 36. This air will then pass through the series of passages 52 in succession in a generally annular direction around the furnace and preferably in a direction opposite to the flow of the hot gases in passages 41. After the air is passed through the passages 52, it may be conducted through an outlet 54, conduits as at 55, and thence down to furnace air inlets as at 56 and 57 located at one or more of the lower hearths. The air inlets 56 and 57 may be accompanied by suitable fuel burning devices such as oil burners 58 for supplying heat to the furnace if any is found necessary to maintain the proper temperature for incinerating the waste material and eliminating the odors from the evolved gases. These oil burners may also be used to supply the heat necessary to initiate the process. In some cases, once the process has been initiated, it will be found that there is sufficient heat value in the waste material when economically utilized, as is possible with this invention, to continue the process without extraneous fuel.

It will be noted, as indicated in Figs. 4 and 5, that each of the heat transfer plates or sections 47 of the recuperator may be formed with a vertical flange as at 60 along one edge to provide a vertical barrier between adjacent cavities 52, the flanges on alternate sections being cut away respectively at the top and bottom to provide passages as at 61 and 62 for interconnecting adjacent cavities 52. The outer walls of each section 47 may also be formed with suitable radiating fins or the equivalent as at 48' to increase the area of contact with the air being heated.

It will be noted that the furnace wall portions except where covered by the recuperator construction, may preferably be formed with an outer layer of insulating brick as at 64 (Fig. 1), embraced by a sheet metal cylindrical shell 65 in accordance with the usual construction of furnaces of this type. However, at the areas of the wall which are covered by the recuperator construction, the insulation brick 64 may be at least partially eliminated and instead the outer shell 53 of the recuperator may be covered with insulation as at 66 formed of plaster or other suitable material. The portions of the recuperator which extend beyond the normal circumference of the furnace wall may be supported by a suitable annular ring as at 67 of right angular cross-section.

The upper ends of all of the recuperator cavities 41, and also the cavities 52 if desired, may be closed by removable cover means as at 68 extending annularly around the top of the furnace and formed in suitable sections convenient for individual removal if desired. It will be noted that upon removal of these cover sections, all of the recuperator cavities are rendered conveniently and directly accessible for inspection, cleaning or replacement of parts without necessarily disturbing the connecting conduits or the outer insulated recuperator wall.

In some cases it may be found desirable to provide additional air inlets for the furnace at points spaced from the inlets 56 and 57 and under some circumstances it may be found to be satisfactory and more desirable to supply air for such inlets without passing such air through all of the air cavities of the recuperator. In that event air may be taken from the cavities 52 at some point spaced from the recuperator air outlet 54, as for example an air outlet 70 connected to a conduit as at 71 running to air inlets as at 72 and 73, which may also be accompanied by oil burners if desired. The flow of air through conduit 71 may be cut off or regulated if desired, as by a suitable damper 74.

It is necessary or highly desirable to provide doors at each of the furnace hearths to permit inspection of the conditions prevailing at each hearth and to give convenient access to each hearth to enable repair or replacement of the furnace parts. With the recuperator construction above described surrounding the upper hearths, it is preferable to provide the doors as at 75 (Fig. 3) at such hearths, in vertical alignment, so that the space required for such doors will be confined to one section of the furnace wall and not interfere excessively with the space required for the recuperator passages and the inlets and outlets thereto. It is also desirable to provide the inlets and outlets for the recuperator respectively adjacent to and at opposite sides of the doors as shown, that is, so that the gas or air admitted at an inlet at one side of the door may continue uninterrupted through the recuperator cavities around the furnace wall back to an outlet at the other side of the door.

With apparatus of this character as heretofore used, it has been customary to provide a recuperator spaced from and mounted separately from the multiple hearth furnace, but interconnected therewith by a plurality of conduits as shown in said Patent 2,015,050. However, the above described arrangement by which the recuperator is built into the furnace walls as a unitary structure, comprising an integral part of the furnace, embodies a number of important advantages over such prior constructions. The space required for the apparatus is greatly reduced, so that there is a substantial saving in floor area required and consequently a great saving in the cost of the building for housing the equipment. By mounting the recuperator construction around the furnace walls, it is unnecessary to increase the height of the building beyond that required for the furnace alone. The small increase in the diameter of the top of the furnace resulting from the recuperator construction involves no necessity for increasing the space normally provided for a furnace alone, since the space around the top of the furnace is ordinarily not utilized. Therefore, substantially the entire space requirements for the separate recuperator as used in prior arrangements may with this invention be eliminated. The necessity for a separate mounting or foundation for the recuperator is also avoided.

Inasmuch as the recuperator may be arranged on the furnace with its several inlets and outlets closely adjacent or at the furnace inlets and outlets, substantially all of the expense of special piping between the furnace and recuperator as used in previous constructions, may with this invention be eliminated. Furthermore, the furnace and recuperator assembly may, to a greater extent than formerly, be standardized for various installations and the parts therefor may be constructed in the factory instead of requiring special piping work on each installation. Furthermore, since the walls of the gas cavities of the recuperator to a large extent comprise a wall of the furnace, this unitary construction makes possible a considerable saving of materials and particularly in insulating materials. The necessity of applying insulation to special connecting conduits for each installation is avoided. And what is perhaps more important over any considerable period of time, great savings may be effected with this consolidated equipment in that heat losses from the furnace and recuperator walls and connecting piping may be greatly reduced by bringing these parts into a unitary construction. That is, heat losses by radiation both from the air and gas pipes to and from the recuperator is practically eliminated, and undesired radiation from the hot gas cavities of the recuperator is also substantially avoided, since such cavities are enveloped by the hot wall structure of the furnace, and radiation from the furnace wall areas embraced by the recuperator, is also reduced.

As above explained, it is desirable to have the gases leave the furnace at a relatively high temperature to insure that obnoxious odors will be eliminated. To this end it is desirable that the furnace walls enveloped by the recuperator be prevented from radiating heat to the extent that excessive fuel might be required to maintain such temperature of the gases within the furnace. It will be noted in the above described construction that the refractory brick wall 42 may serve to insulate to a considerable extent the adjacent hearth spaces of the furnace and this insulating effect is suplemented by the hot gas cavities formed within such wall. The hot gas cavities in turn are protected to a considerable extent against any excessive cooling by reason of the fact that they are surrounded by the recuperator air passages through which flows a stream of air already somewhat preheated by passage through the rabble arm conduits.

At times it may be found desirable to operable the furnace at temperatures in excess of the normal requirements, thus producing an excessive supply of hot exit gases from the furnace which might be destructive to the recuperator. If for this or other reasons it is desired not to pass all of such hot exit gases through the recuperator, some of such gases may be by-passed, as for example from a furnace gas outlet 76, through a conduit 77 to the stack. The conduit 77 may, however, be usually kept closed as by a damper 78.

While with the above described example of the invention the recuperator is built around the upper two hearths of the furnace, it will be understood that under some circumstances it may be found desirable to have the recuperator extend over a greater portion of the surface of the furnace to provide heat exchanging surfaces of greater area, or to have the recuperator embrace the middle or lower portions of the furnace.

Figure 8:
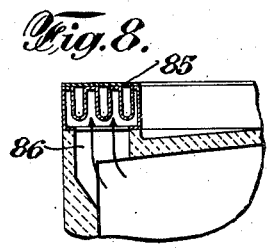
Fig. 8 is a fragmentary sectional view taken substantially along the line 8—8 of Fig. 6.
Figure 9:
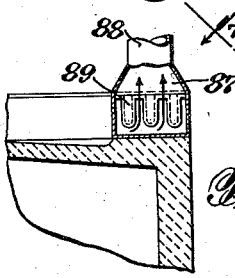
Fig. 9 is a fragmentary sectional view taken substantially along the line 9—9 of Fig. 6.
Figure 7:
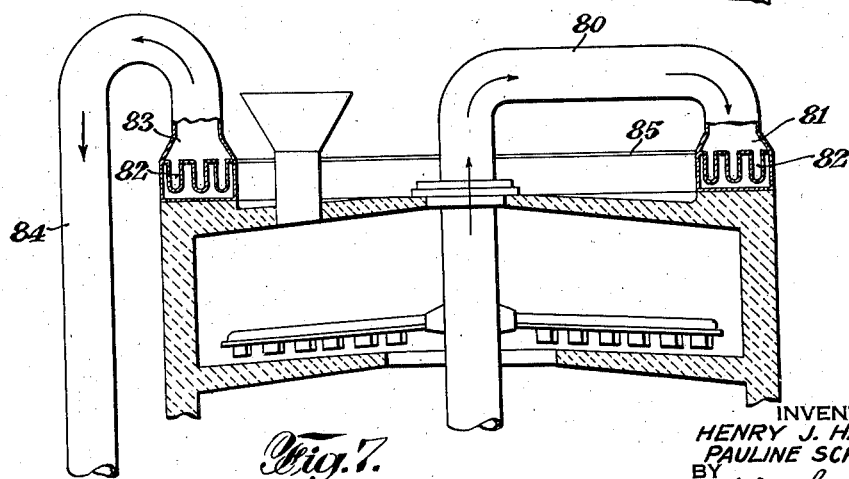
Fig. 7 is a vertical sectional view taken substantially along the line 7—7 of Fig. 6.

Figs. 6 to 9 inclusive illustrate an additional embodiment of the invention, in which the recuperator is constructed in annular form and mounted upon the top edge of the furnace wall. In this example of the construction, air from the rabbling system may be conducted through a conduit 80 to an air intake 81 of the recuperator and the recuperator may include a plurality of deeply channeled cavities as at 82 for conveying the air, for example, in a counterclockwise direction through the device to an air outlet at 83 connected with a conduit 84 for conveying the preheated air down to the incinerating hearths of the furnace. The tops of the channel shaped cavities 82 may be covered as by a ring shaped sheet metal cover plate 85 forming the top of the recuperator.

The spaces beneath and between the channel shaped members 82 provide cavities for conducting hot exit gases from the furnace as through outlet 86 (Fig. 8), around the recuperator in a clockwise direction for example, and to an outlet opening 87 which may be connected as by conduit 88 to a stack or other means for disposal of the relatively cooled waste gases. The hot air cavities may be sealed as by plates 89 at a point between the air intake 81 and the gas outlet 87.

The external walls of the recuperator parts and conduits of the embodiment of Figs. 6 to 9, may be insulated with suitable insulating material applied in a well-known manner, such material being omitted in the drawings for simplicity of illustration.

Either or both of the above described recuperator constructions may be connected and utilized in lieu of the recuperators of the systems disclosed in the copending applications Ser. No. 95,950, filed August 14, 1936, and Ser. No. 96,576, filed August 18, 1936, or the system of the patent to Hartley, Reissue No. 20,046, granted July 28, 1936.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patents is:

1. Apparatus for incinerating waste materials, comprising a furnace having a plurality of superposed hearths surrounded by a generally cylindrical furnace wall, said wall being provided with openings at each of said hearths, said openings having removable closures permitting access to each hearth, means for introducing air into the furnace for aiding combustion, means for withdrawing gaseous products of combustion from the furnace, means for bringing said air and gaseous products into heat interchanging relationship comprising a recuperator extending substantially annularly around the furnace wall and substantially completely covering the surface of the portions of the wall surrounding at least two of the hearths except for the areas occupied by said openings, the openings for said last mentioned hearths being substantially in vertical alignment, said recuperator being provided with inlets and outlets adjacent said openings.

2. Apparatus for drying and incinerating waste materials comprising a furnace having a plurality of superposed hearths surrounded by a generally cylindrical furnace wall, means for introducing the material onto an upper hearth, means for rabbling the material over each hearth and from hearth to hearth down through the furnace, one or more of the upper hearths being provided for drying the material and lower hearths being provided for incineration thereof, means for introducing air at one or more of the incinerating hearths, and means for preheating said air comprising a recuperator of substantially annular shape, mounted upon the upper portion of said wall and substantially concentric therewith, said recuperator including an air passage extending around the top of the furnace and communicating at its intake end with a source of air supply and at its outlet end with an air inlet to the furnace, and a gas passage substantially coextensive with said air passage and extending around the top of the furnace between the furnace wall and said air passage, said gas passage having its intake end connected to receive hot combustion gases from within the furnace and its outlet end connected to a gas exit.

HENRY J. HARTLEY.
PAULINE SCHROEDER.